(12) United States Patent
Spidell

(10) Patent No.: US 8,348,636 B2
(45) Date of Patent: Jan. 8, 2013

(54) WAVE ENERGY CONVERTER

(76) Inventor: Terry L. Spidell, Strasburg, OH (US)

( * ) Notice: Subject to any disclaimer, the term of this patent is extended or adjusted under 35 U.S.C. 154(b) by 715 days.

(21) Appl. No.: 12/501,596

(22) Filed: Jul. 13, 2009

(65) Prior Publication Data

US 2011/0008178 A1     Jan. 13, 2011

(51) Int. Cl.
*F04B 17/00* (2006.01)
*F04B 35/00* (2006.01)
*F04B 13/10* (2006.01)

(52) U.S. Cl. ........... 417/333; 417/330; 417/331; 290/53
(58) Field of Classification Search .................... 417/53, 417/330, 331, 333, 337, 338; 290/53
See application file for complete search history.

(56) References Cited

U.S. PATENT DOCUMENTS

| | | | | |
|---|---|---|---|---|
| 580,073 | A | * | 4/1897 | Williams et al. .............. 417/333 |
| 793,497 | A | * | 6/1905 | Ariztia ........................... 417/333 |
| 1,523,031 | A | * | 1/1925 | Mitchell, Jr. .................. 417/333 |
| 7,980,832 | B2 | * | 7/2011 | Ahdoot .......................... 417/333 |

* cited by examiner

*Primary Examiner* — Peter J Bertheaud
(74) *Attorney, Agent, or Firm* — Renner Kenner Greive Bobak Taylor Weber

(57) ABSTRACT

A wave energy converter for compressing air from the movement of waves of a body of water is provided. The wave energy converter includes a middle cylinder upon which an upper cylinder slides thereon and in which a lower cylinder slides therewithin. An upper and lower compression chamber disposed within the upper and lower cylinders allows air to be drawn therewithin and compressed when the upper and lower cylinders are moved relative to the middle cylinder as waves progress through their wavelength from crest to trough and vice versa.

20 Claims, 14 Drawing Sheets

WAVE ENERGY CONVERTER

TECHNICAL FIELD

Generally, the present invention relates to an energy converter. More particularly, the present invention relates to a wave energy converter for compressing air using the movement of waves from a body of water.

BACKGROUND ART

Currently, the desire to transition away from fuels, such as petroleum and coal that generate harmful byproducts from their use in the generation of electrical and mechanical power is greater than ever. In addition, the dramatic fluctuations in the price of these fuels, as well as our reliance on continued foreign supply, and its increasing demand, has also contributed to the urgent need to identify and develop alternative sources of energy to offset the importation of energy generating fuels.

One alternative energy source that has been studied relates to wave phenomena, which utilizes the properties of large bodies of liquids to transmit energy and momentum by vibratory impulses. In particular, waves occurring on the surface of the ocean, have several identifiable characteristics, which include: the crest, which is the highest point of the wave; the trough, which is the lowest point of the wave; the height, which is the vertical distance between the crest and the trough; the wavelength, which is the horizontal distance between the crest and the trough; the period, which is the time that elapses during the passing of one wavelength; the frequency, which is the number of waves that pass a particular point per unit time; and the amplitude, which is half the height distance and is equal to the energy of the wave. Thus, during the transition of the wave from trough to crest during its wavelength, an endless source of kinetic energy is provided, which provides a source of renewable energy that can be generated with the emission of little or no pollution.

While several attempts have been made to extract the energy embodied by wave movements, many have undesirable limitations or drawbacks. For example, many wave energy conversion systems utilize numerous moving parts that are susceptible to corrosion from salt contained in seawater, thus requiring frequent maintenance and periodic replacement of the system. In addition, other wave energy conversion systems are designed so that they are operable only along the seashore or only in shallow waters, severely limiting the placement of such systems. In addition, because of the development of coastal shores, it is undesirable to populate such areas with wave energy conversion systems due to their negative impact on the otherwise aesthetically pleasing shoreline. Furthermore, other wave energy conversion systems do not capture the kinetic energy supplied by the entire wavelength of the wave, and thus only captures the kinetic energy of the wave during movements to the trough or to the crest. As a result, current wave energy conversion systems fail to utilize the full kinetic energy supplied by the wave as it cyclically transitions between the crest to trough and vice versa, therefore inefficiently harvesting energy therefrom.

Therefore, there is a need in the art for a wave energy converter that can be disposed anywhere within a body of water and which converts energy from the complete movement of the wave as it transitions between crest to trough and vice versa.

SUMMARY OF INVENTION

In general, the present invention provides a wave energy converter for compressing air from the movement of a wave, comprising a first cylinder having a first cap end opposite a first open end, such that a first compression chamber is disposed within said open end and is in fluid communication with a first intake valve and a first exhaust valve carried by said first cap end; a second cylinder having a second cap end opposite a second open end, said second cap end being covered by a first compression head that is carried by said second cylinder, said first compression head being slideably received within said first open end of said first cylinder and is in operative engagement with said first compression chamber, said second cylinder providing a second compression chamber disposed within said second open end that is in fluid communication with a second intake valve and a second exhaust valve carried by said second cap end, said upper and lower intake valves adapted to receive air; a third cylinder having a closed end that is opposite a second compression head that is slideably received within said second open end of said second cylinder and which is in operative engagement with said second compression chamber; and a frame attached to said first and third cylinders, so as to retain said first and third cylinders with respect to said second cylinder as said first and third cylinders move; wherein said second cylinder is configured to be buoyant at about a calm water level, such that said first and second compression chambers receive air through said first and second intake valves as said first and third cylinders move away from said calm water level, said intake valves being closed, so as to compress said first and second compression chambers as said first and third cylinders move toward the calm water level to compress the air, the compressed air being released through said first and second exhaust valves.

Another aspect of the present invention provides a method of compressing air comprising, providing a wave energy converter having a first cylinder that includes a first flexible compression chamber, a second cylinder that includes a second flexible compression chamber and a compression head that is operatively engaged with said first compression chamber, and a third cylinder that includes a second compression head that is operatively engaged with said second compression chamber; maintaining said second cylinder buoyant at about a calm water level that is approximately between the water level of wave crests and wave troughs; floating said first cylinder upward from the clam water level toward the wave crest to draw air into said first compression chamber; moving said first cylinder downward toward the calm water level after the occurrence of the wave crest to compress air in said first compression chamber; transferring the compressed air to a holding tank that is in fluid communication with said first compression chamber; moving said third cylinder downward away from the calm water level toward the wave trough to draw air into said second compression chamber; floating said third cylinder upward toward the calm water level after the occurrence of the wave trough to compress air in said second compression chamber; and transferring the compressed air to said holding tank that is in fluid communication with said second compression chamber.

Still another aspect of the present invention provides a wave energy converter for compressing air from the movement of a wave, comprising a first cylinder having a first cap end opposite a first open end, such that a first compression chamber is disposed within said open end and is in fluid communication with a first intake valve and a first exhaust valve carried by said first cap end; a second cylinder configured to be buoyant at a calm water mark, said second cylinder having a second cap end opposite a second open end, said second cap end being covered by a first compression head that is slideably received within said first open end of said first cylinder and is in operative engagement with said first compression chamber, said second cylinder providing a second flexible compression chamber disposed within said second open end that is in fluid communication with a second intake valve and a second exhaust valve carried by said second cap end, said first and second intake valves adapted to receive air; a third cylinder having a closed end that is opposite a second compression head that is slideably received within said second open end of said second cylinder and which is in operative engagement with said second compression chamber; and a frame attached to said first and third cylinders, so as to retain said first and third cylinders with respect to said second cylinder as said first and third cylinders move; wherein as said first cylinder is floated from the calm water level by a wave crest, said first intake valve is opened and said first exhaust valve is closed, so as to draw air into said first compression chamber, and as said first cylinder returns to the calm water level, said first intake valve is closed and the air in said first compression chamber is compressed until a predetermined pressure is reached to release the compressed air through said first exhaust valve, and as said third cylinder falls from the calm water level by a wave trough, said second intake valve is opened and said second exhaust valve is closed, so as to draw air into said second compression chamber, and as said third cylinder is floated upward toward the calm water level, said second intake valve is closed, and the air in said lower compression chamber is compressed until a predetermined pressure is reached to release the compressed air through said Second exhaust valve.

BRIEF DESCRIPTION OF THE DRAWINGS

One or more objects and advantages of the present invention will become apparent from the subsequent detailed description of the preferred embodiment and the appended claims taken in conjunction with the accompanying drawings where:

DETAILED DESCRIPTION OF THE INVENTION

Figure 1:
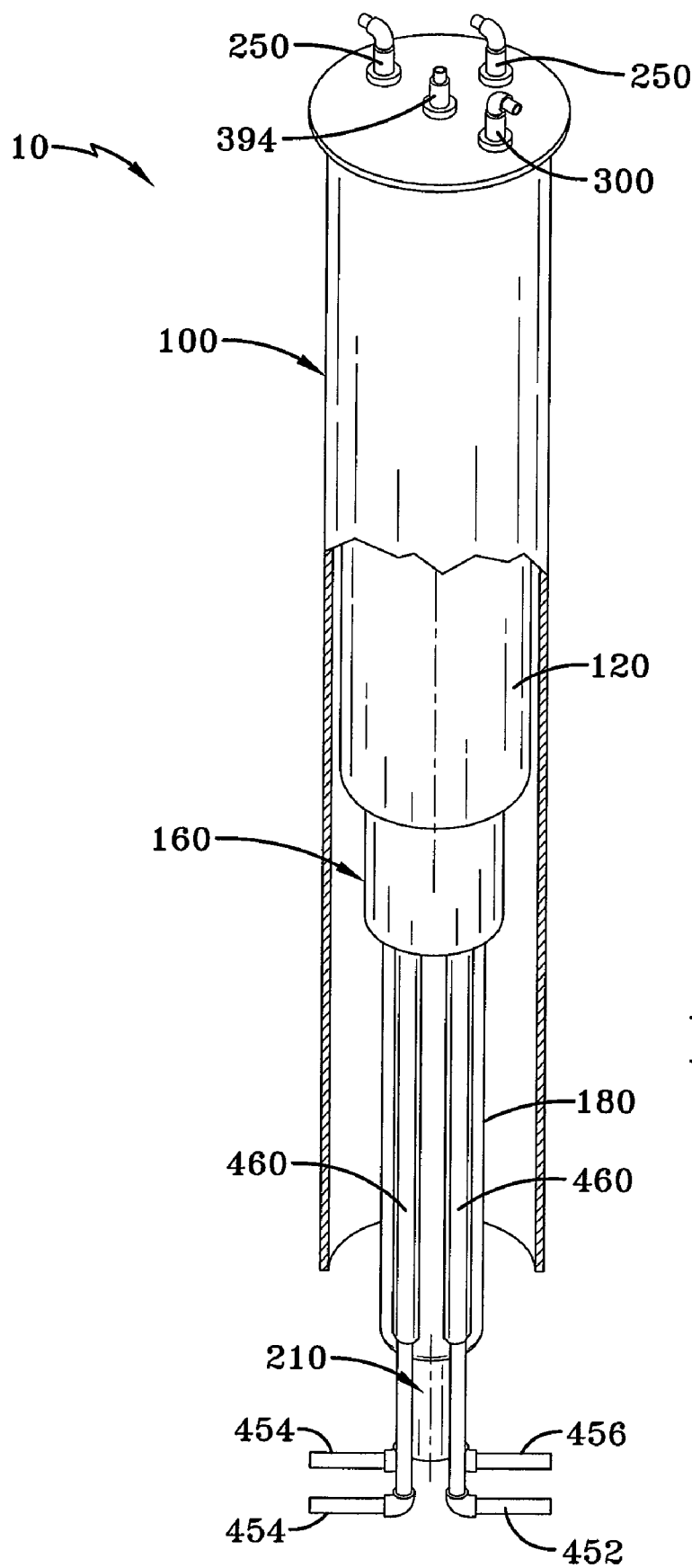
FIG. 1 is a cutaway view of a wave energy converter in accordance with the concepts of the present invention.

One embodiment of a wave energy converter used to generate compressed air from the movement of waves of a body of water, is generally referred to by the numeral 10, as shown in several Figs. of the drawings. With regard to FIGS. 1 and 2, the wave energy converter 10 comprises an upper cylinder 100 that provides an upper compression chamber 110 that is defined by an upper flexible bladder 120. Inserted within the upper cylinder 100 and in operative engagement with the upper flexible bladder 120 is an upper head 150 provided by a middle cylinder 160. The middle cylinder 160 also includes a lower compression chamber 170 that is defined by a lower flexible bladder 180 that is attached to the middle cylinder 160. Inserted within the middle cylinder 160 and in operative engagement with the lower flexible bladder 180 is a lower head 200 that is provided by a lower cylinder 210. In addition, a set of intake valves 250 and 260 maintained by respective upper and middle cylinders 100,160 allows air from the outside environment to enter the upper and lower compression chambers 110 and 170, while exhaust valves 300 and 310 that are maintained by respective upper and middle cylinders 100, 160 allows air that is compressed within the upper and lower compression chambers 110 and 170 to be exhausted to a storage tank 320 coupled thereto.

Thus, when the wave energy converter 10 encounters a wave crest, the upper cylinder 100 is moved upward, allowing the upper compression chamber 110 to fill with air, and as the wave crest subsides and the water level returns to a calm water level, the upper cylinder 100 moves downward, such that the air in the upper compression chamber 110 is compressed by the upper head 150 of the middle cylinder 160. Similarly, when the wave energy converter 10 encounters a wave trough, the lower cylinder 210 is moved downward, allowing the lower compression chamber 170 to fill with air and, as the wave trough subsides and the water level returns to the calm water level, the lower cylinder 210 moves upward, such that the air in the lower compression chamber 170 is compressed by the lower head 200 of the lower cylinder 210. Thus, the wave energy converter 10 provides two compression strokes as the wave completes each cycle or wavelength during a single wave cycle, or one wavelength, during which the wave transitions from a wave crest to a wave trough or vice versa, thus providing enhanced operating efficiency. And because waves transition between crest and trough approximately 7-9 times a minute, a substantial amount of compressed air is generated by the converter 10, which can subsequently be processed into hydrogen, so as to provide a source of energy that has reduced pollution levels.

Figure 2:
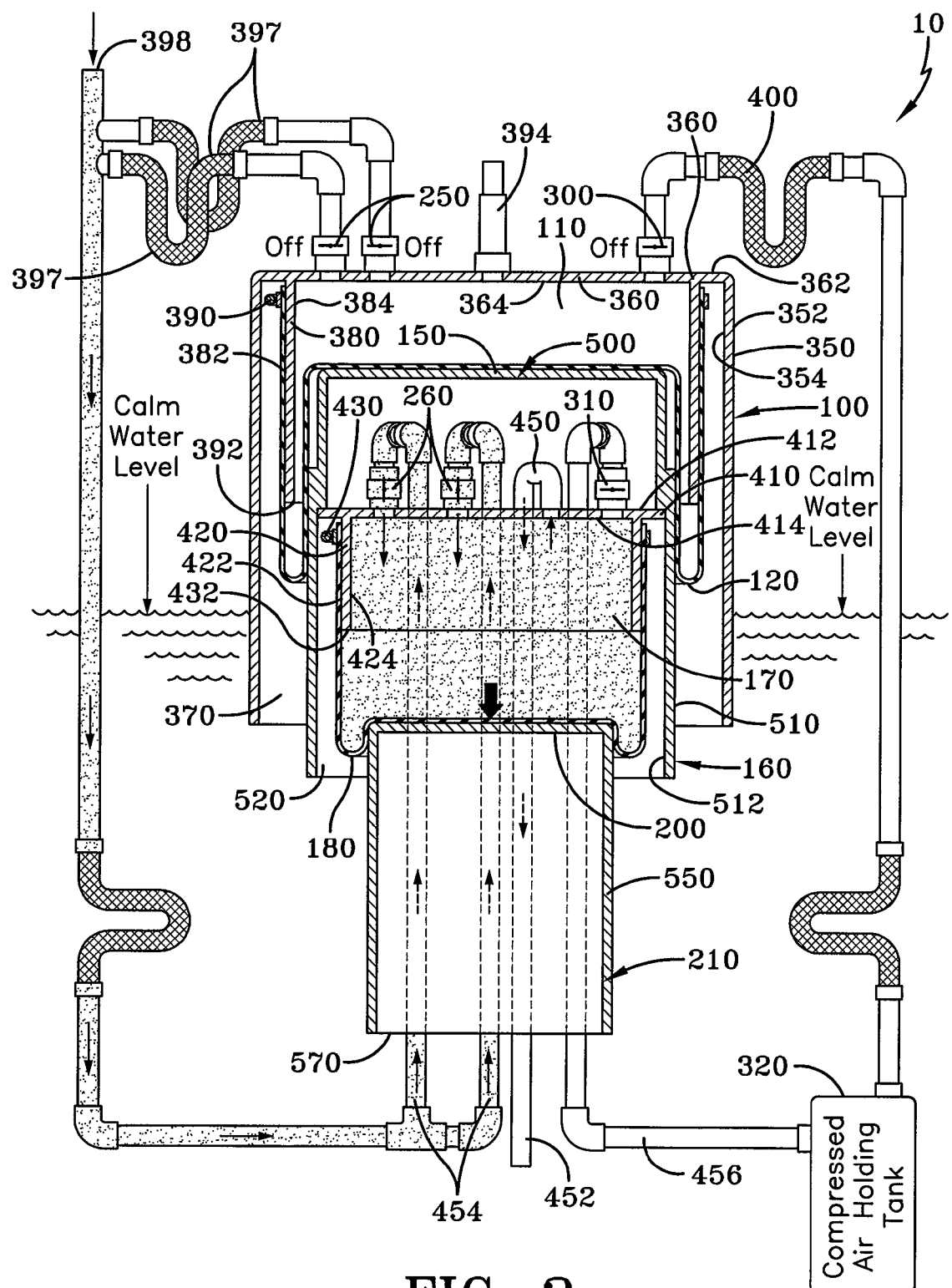
FIG. 2 is a sectional view of the wave energy converter showing the upper, middle, and lower cylinders in accordance with the concepts of the present invention.

Specifically, as shown in FIG. 2, the upper cylinder 100 of the wave energy converter 10 provides a cylindrical wall 350 having an outer surface 352 opposite an inner surface 354. The cylindrical wall 350 is bounded at one end by an end cap 360 having an outer surface 362 opposite an inner surface 364 that is adjacent an open receiving chamber 370 that is formed by the wall 350 and end cap 360. In one aspect, the upper cylinder 100 is formed from any suitable material, such as plastic, aluminum, or the like. Concentric with the cylindrical wall 350 is an upper guide wall 380 that extends from the inner surface 364 of the end cap 360 to a point that is approximately half the length of the cylindrical wall 350 of the upper cylinder 100. The upper guide wall 380 provides an outer surface 382 and an opposed inner surface 384, such that the outer surface 362 is adjacent to the cylindrical wall 350. It should be appreciated that while the guide wall 380 is shown as having a substantially cylindrical, cross-sectional shape, the guide wall 380 may take on other cross-sectional shapes as well, such as a rectangular cross-section for example.

Figure 5:
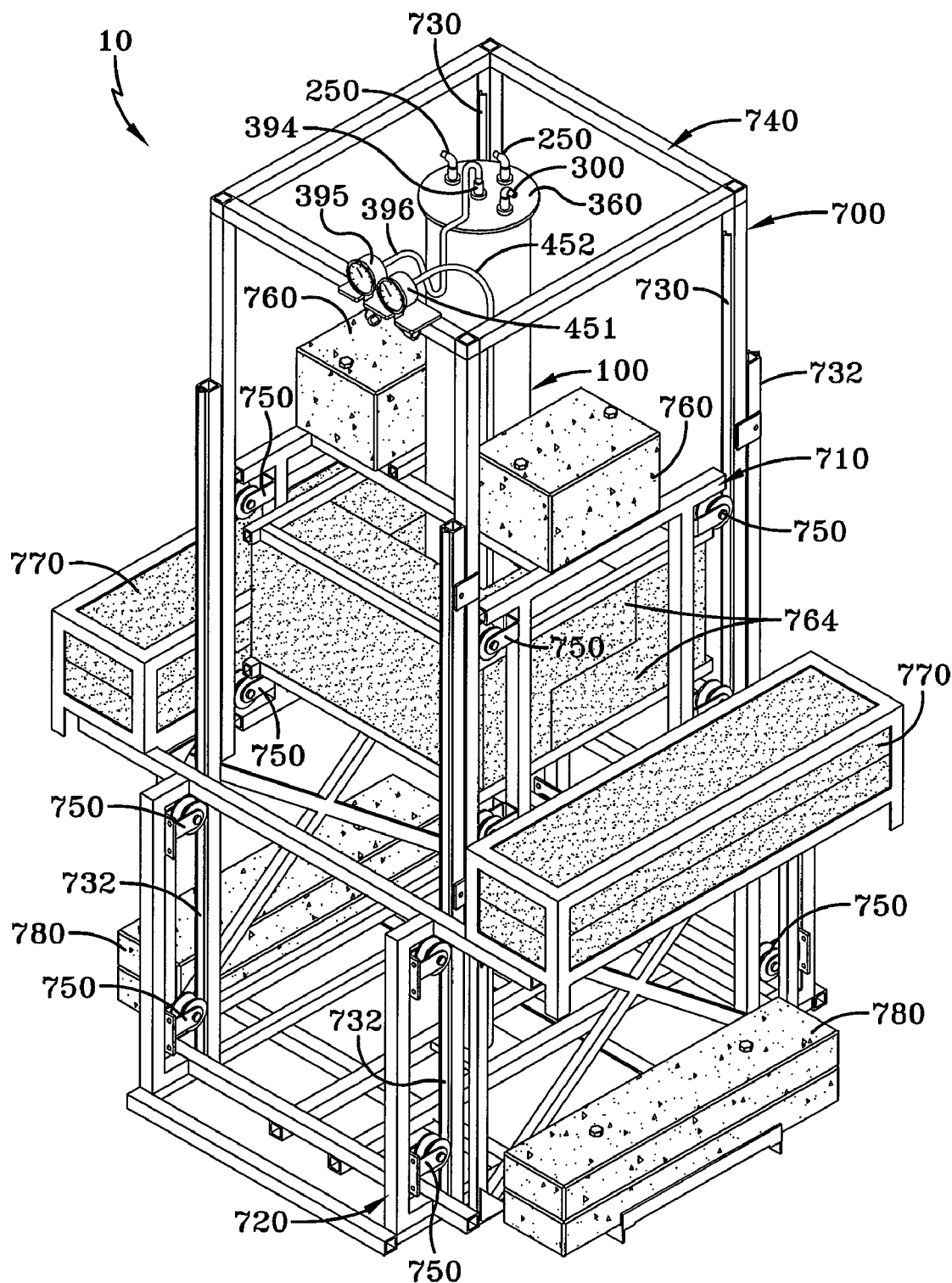
FIG. 5 is perspective view of the upper, middle, and lower cylinders as they are carried by a frame in accordance with the concepts of the present invention.
Figure 6:
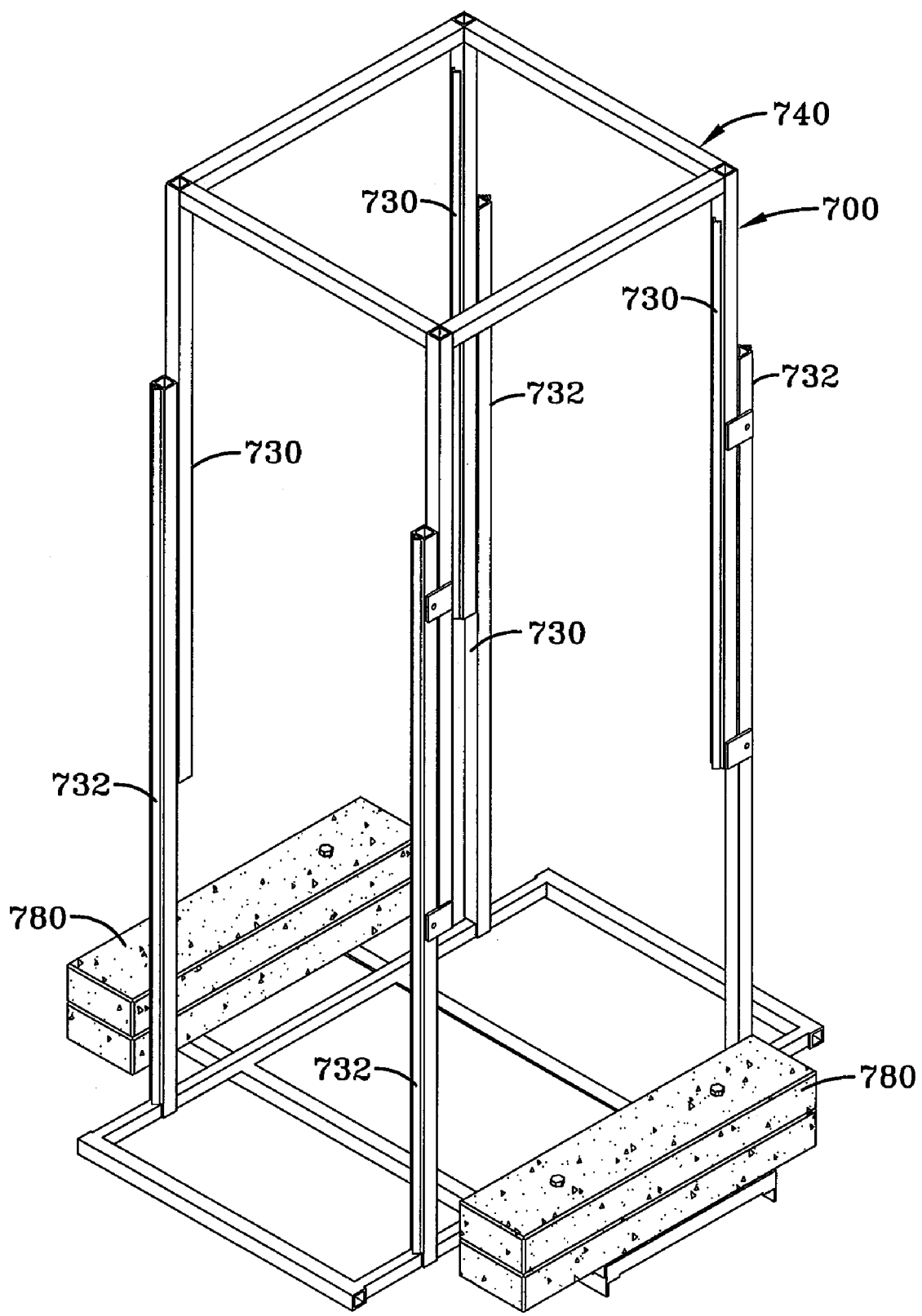
FIG. 6 is a perspective view of a main support frame section provided by the support frame in accordance with the concepts of the present invention.
Figure 7:
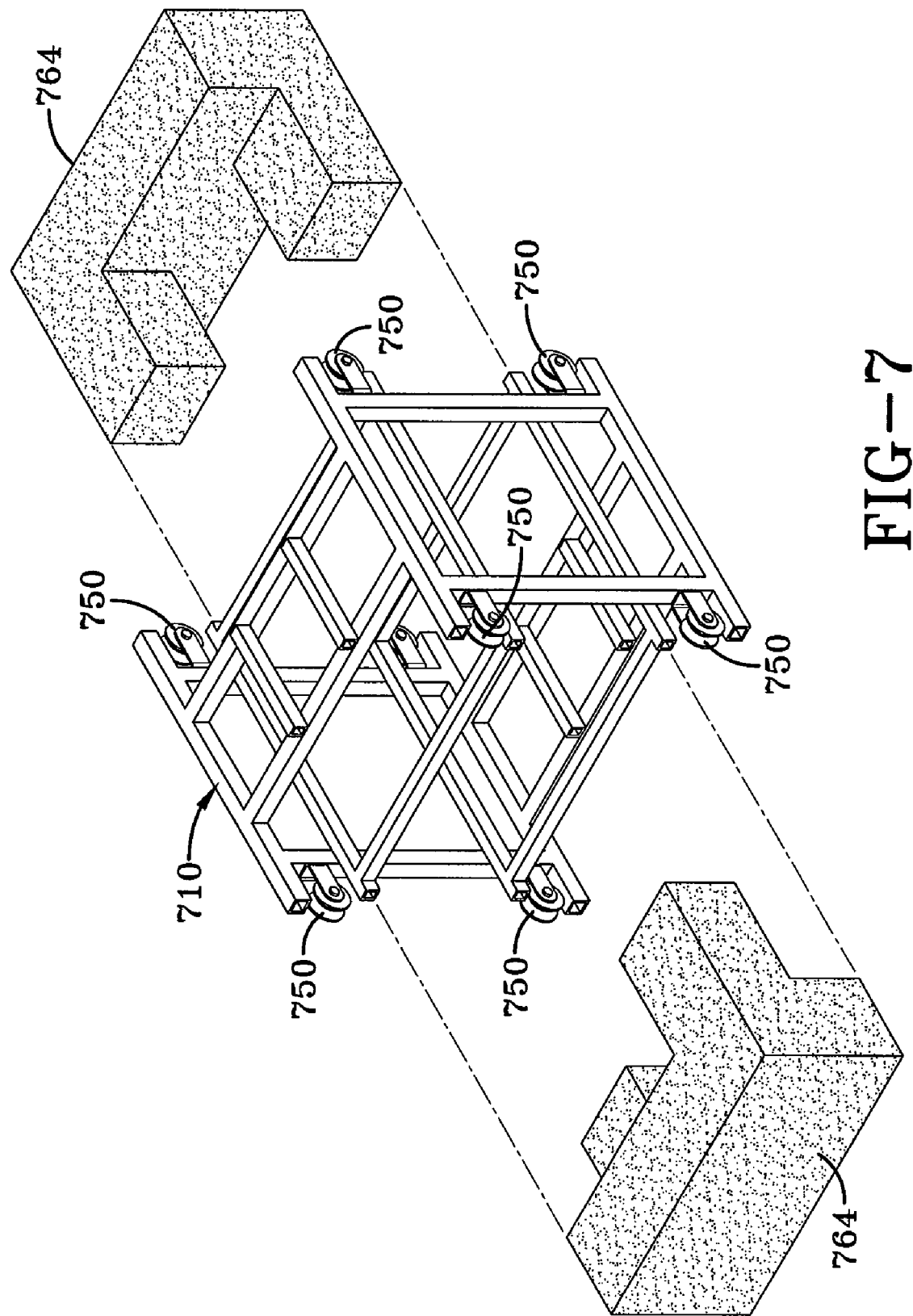
FIG. 7 is a perspective view of an upper sliding frame carrier provided by the support frame in accordance with the concepts of the present invention.
Figure 8:
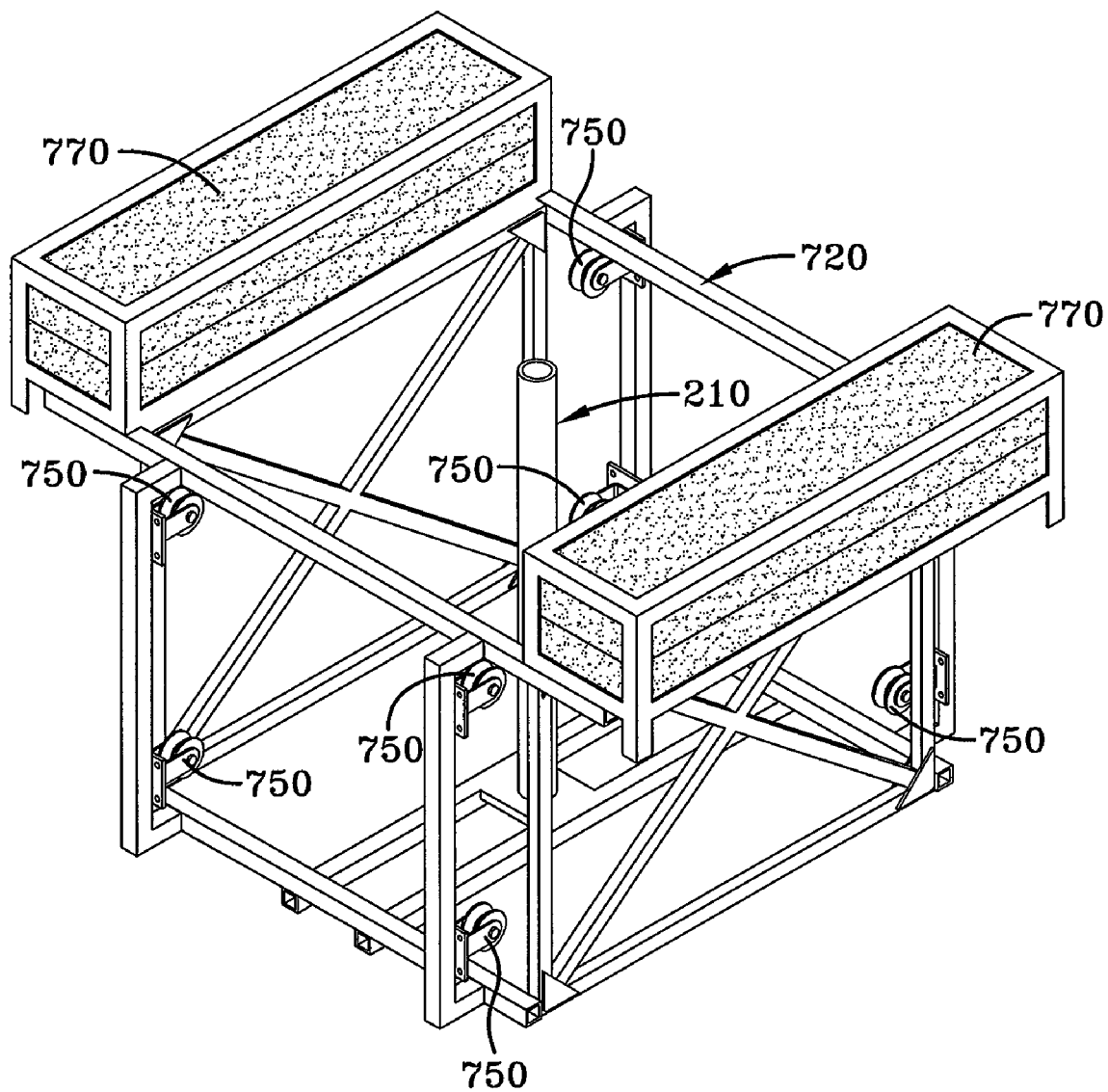
FIG. 8 is a perspective view of a lower sliding frame carrier provided by the support frame in accordance with the concepts of the present invention.

Attached about the outer surface 382 of the cylindrical guide wall 380 at a point proximate to the inner surface 364 of the end cap 360 by one or more clamps 390, or other suitable means of attachment, is the upper bladder 120, which may be formed from any suitable material, such as rubber, including reinforced rubber; latex; or the like. Furthermore, the upper bladder 120 may be configured, such that it is substantially cylindrical in shape when the upper compression chamber 110 is filled with air. The upper bladder 120 is also configured to be folded over a bottom edge 392 of the upper guide wall 380, whereby a portion of the bladder 120 is maintained adjacent to the outer surface 362 of the upper guide wall 380 and another portion of the bladder 120 is maintained adjacent to the inner surface 384 of the upper guide wall 380. In addition, the upper bladder 120, along with the inner surface 364 of the end cap 360 defines the upper compression chamber 110, and is in fluid communication with the upper intake valves 250 and the exhaust valve 300 that are disposed upon the end cap 360 and positioned within the region of the upper end cap 360 that is circumscribed by the guide wall 380. In another aspect, an upper pressure port 394 is also disposed in the cap 360 and is in operative communication with the upper compression chamber 110 for connection to a suitable pressure gauge 395 via a hose 396, as shown in FIG. 5, to monitor the pressure therewithin.

In another aspect, the converter 10 includes flexible intake attachment lines 397 that couples the intake valves 250 to an inlet port 398 that is positioned above the surface of the water so that air can be drawn into the upper compression chamber 110. Additionally, to allow the air compressed by the upper compression chamber 110 to be transferred and stored, a flexible exhaust attachment line 400 couples the upper exhaust valve 300 to the holding tank 320.

Figures 3, 3A:
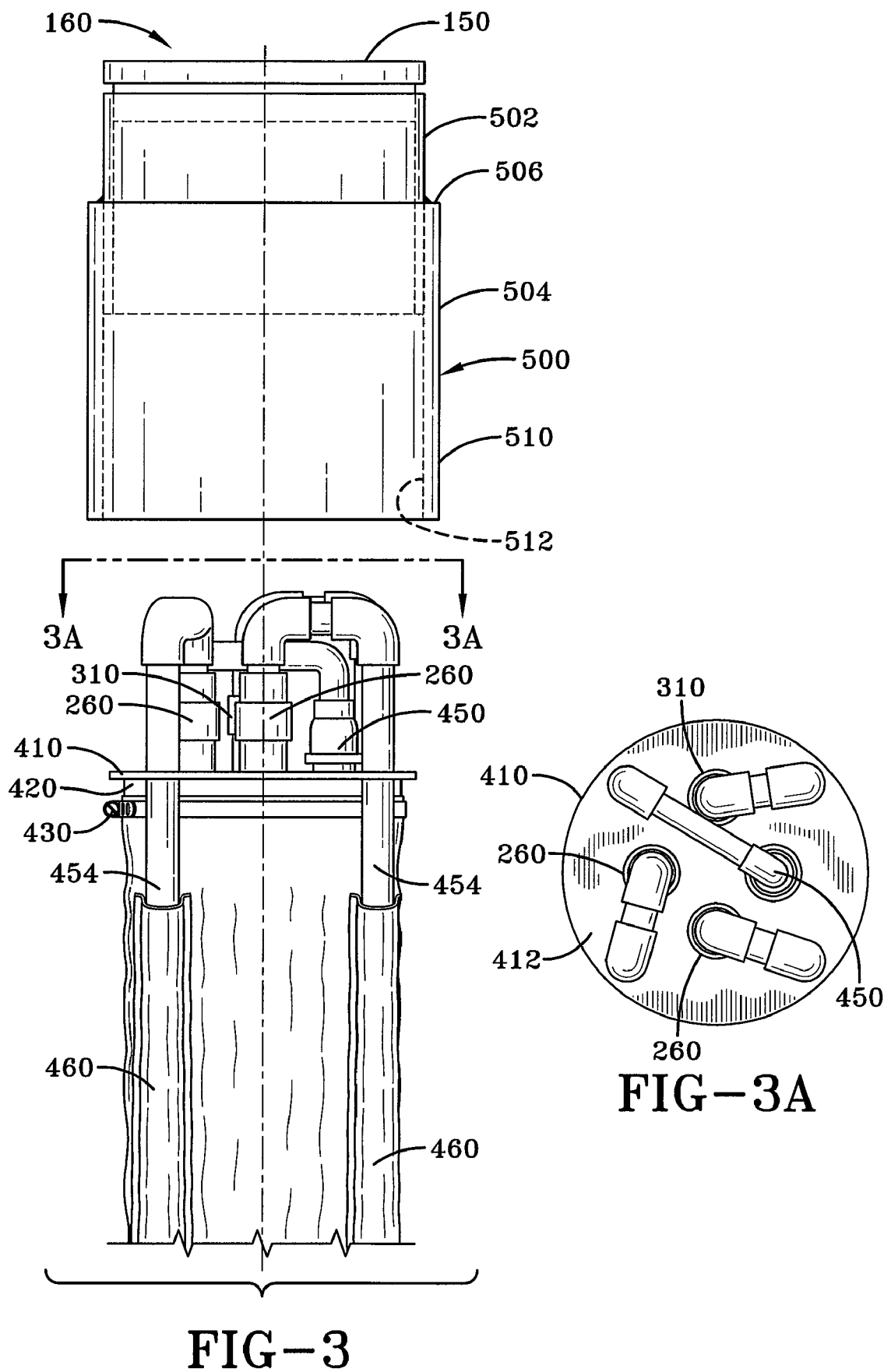
FIG. 3 is an elevational view of the middle cylinder in accordance with the concepts of the present invention.
FIG. 3A is a top plan view of the middle cylinder in accordance with the concepts of the present invention.
Figure 4:
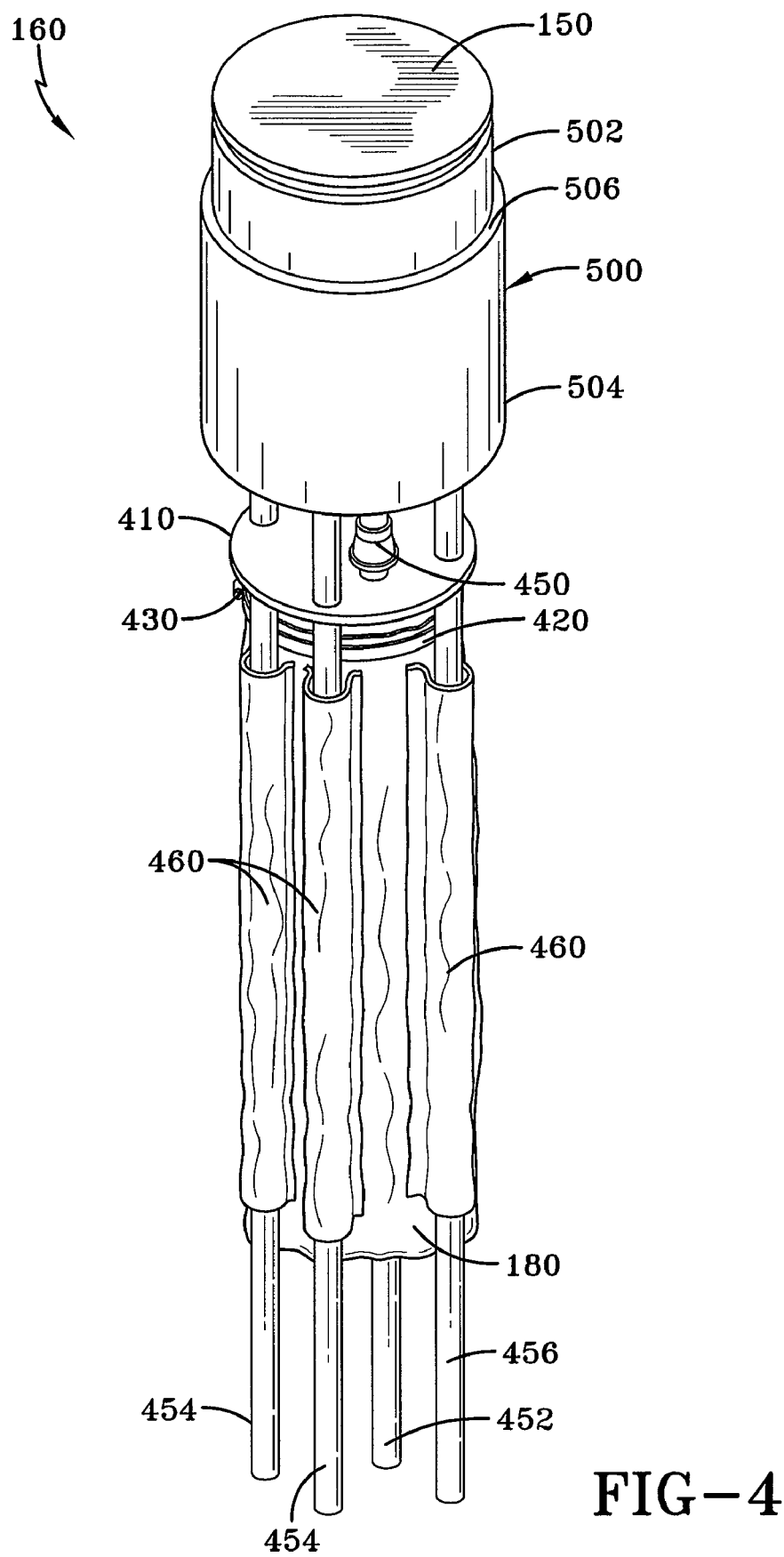
FIG. 4 is a perspective view of the middle cylinder in accordance with the concepts of the present invention.

Received within the open receiving chamber 370 of the upper cylinder 100 is the middle cylinder 160. Specifically, the middle cylinder 160 of the wave energy converter 10, shown clearly in FIGS. 3-4, provides a cylindrical disk 410 having an outer surface 412 opposite an inner surface 414 from which a lower cylindrical guide wall 420 extends, whereby the lower guide wall 420 includes an outer surface 422 that is opposite an inner surface 424. It should be appreciated that while the lower guide wall 420 is shown as having a substantially cylindrical cross-section, the guide wall 420 may take on other cross-sectional shapes as well, including a square cross-section for example. Attached about the outer surface 422 of the lower guide wall 420 at a point proximate to the inner surface 414 of the disk 410 by one or more clamps 430 or other suitable means of fixation is the lower bladder 180. As such, the region bounded by the lower bladder 180, the guide wall 420, and the inner surface 414 of the disk 410 forms the lower compression chamber 170. Moreover, the lower bladder 180 may be formed from any suitable material, such as rubber, including reinforced rubber; latex; or the like, and may be configured, such that it is substantially cylindrical in shape when the lower compression chamber 170 is filled with air. Continuing, the lower bladder 180 is configured to be folded over a bottom edge 432 of the lower guide wall 420, whereby a portion of the lower bladder 180 is maintained adjacent to the outside surface 422 of the lower guide wall 420, while another portion of the lower bladder 180 is maintained adjacent to the inner surface 424 of the lower guide wall 420.

Continuing, in order to allow air to enter and exit the lower compression chamber 170, the intake valves 260 and the exhaust valve 310 are disposed upon the outer surface 412 of the disk 410, and positioned within a region of the disk 410 that is circumscribed by the lower guide wall 420, such that the valves 260,310 are in fluid communication with the lower compression chamber 170. In one aspect, a lower pressure port 450 is disposed upon the outer surface 412 of the disk 410, such that it is in fluid communication with the compression chamber 170 for connection to a suitable pressure gauge 451 via a fixed pressure line 452, as shown in FIG. 5. Thus, to enable the movement of air, the intake valves 260 are coupled to the inlet port 398 via fixed intake lines 454, while the exhaust valve 310 is coupled to the holding tank 320 via a fixed exhaust line 456. The lower bladder 180 also contains guide jackets 460, as shown in FIGS. 3 and 4, through which the fixed pressure line 452, the fixed intake lines 454, and the fixed exhaust line 456, are received therethrough. As such, the fixed lines 452,454,456 through the guide jackets 460 serve to support the lower bladder 180 so that it is resistant to becoming entangled on itself as air is brought into the lower compression chamber 170 and compressed.

Disposed over and retained to the disk 410 of the middle cylinder 160 is a cover 500, which maintains the upper compression head 150. In one aspect, the cover 500 comprises a first cylindrical section 502 that is separated from a second cylindrical section 504 by a step 506 that extends from the first section 502 to the second section 504 at a substantially right angle. As such, when the cover 500 is placed over the disk 410, the step 506 is configured to rest upon the outer surface 412 of the disk 410, such that the first section 502 provides clearance for the intake and exhaust valves 260,310, as well as the lower pressure port 450, while the second section 504, which includes an outer surface 510 that is opposite an inner surface 512, extends beyond the bottom edge 432 of the lower guide wall 420 so as to form a lower receiving chamber 520. It should be appreciated that the cover 500 may be formed from any suitable material, such as plastic or aluminum for example.

In one aspect, it should be appreciated that the upper and lower compression chambers 110,170 may contain an amount of fluid, such as water, to prevent the material forming the upper and lower bladders 120,180 from becoming adhered together, which would otherwise reduce the operating efficiency of the converter 10.

Received within the lower receiving chamber 520 of the middle cylinder 160 is the lower cylinder 210, which comprises a cylindrical body 550 having the lower compression head 200 disposed at one end and a base 570 disposed at the opposite end. The lower cylinder 210 may be formed out of any suitable material, such as plastic for example. In addition, the body 550 of the lower cylinder 210 may be formed as a solid section or a hollow section, so long as it is suitably buoyant to carryout the functions of the wave energy converter 10. And while the upper cylinder 100, middle cylinder 160, and lower cylinder 210 are shown as being substantially cylindrical in shape, such should not be construed as limiting, as any other suitable shape may be used.

Surrounding the upper, middle, and lower cylinders 100, 160, 210 is a support frame 700, as shown in FIGS. 5-8, that may be formed from any suitable material, such as plastic, aluminum, or the like. The support frame 700 serves to prevent the upper cylinder 100 from being completely pulled off of the middle cylinder 160 and prevents the lower cylinder 210 from completely falling out of the middle cylinder 100. Specifically, to provide retention to the upper and lower cylinders 100,210, and to accommodate the upward and downward travel, the frame 700 is necessarily attached to the second cylinder 160 and maintains an upper sliding frame carrier 710 and a lower sliding frame carrier 720 that are slideably guided upon respective tracks 730,732 of a main support frame section 740 via rollers 750. Specifically, the upper carrier 710 and the lower carrier 720 are respectively attached to the upper cylinder 100 and lower cylinder 210 via one or more attachment pins, bolts, screws, or any other suitable fastener.

In addition, the upper sliding frame carrier 710 also includes an upper weight section 760 and an upper buoyancy section 764, while the lower sliding frame carrier 720 includes a buoyancy section 770. The frame 700 may also include frame weights 780 that are used to keep the wave energy converter 10, and specifically the middle cylinder 160 of the wave energy converter 10, balanced and buoyant to the proper calm water level. That is, the calm water level is the point at which the wave energy converter 10 floats in calm waters that are not progressing to a crest or to a trough. And thus, as the waves move above the calm water level, the upper cylinder 100 is moved to a wave crest and as the water moves below the clam water level the lower cylinder 210 is moved to a wave trough.

Figure 9A:
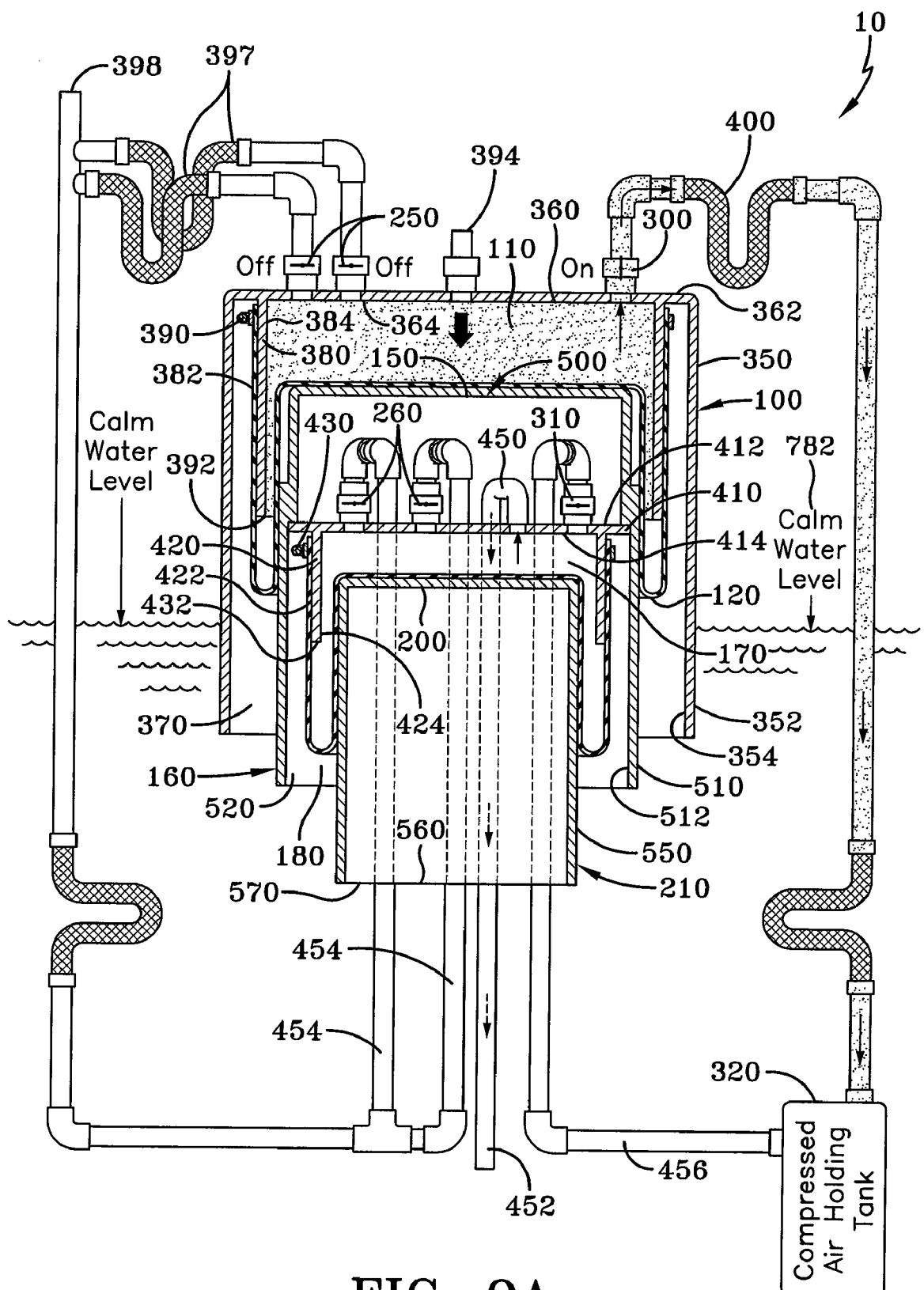
FIG. 9A is a sectional view showing the wave energy converter at the calm water level in accordance with the concepts of the present invention.
Figure 9B:
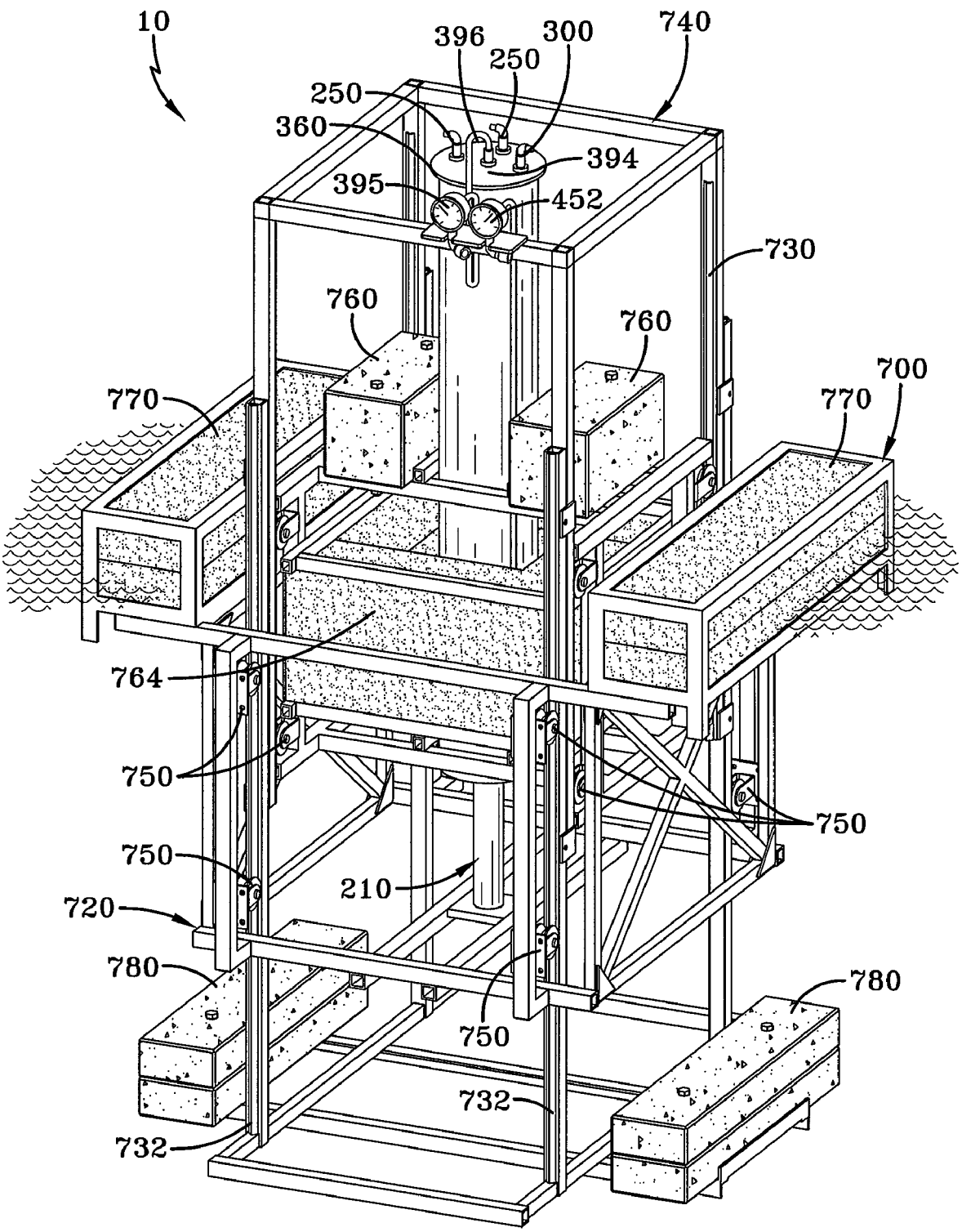
FIG. 9B is a perspective view of the support frame and the upper, middle, and lower cylinders of the wave energy converter when at the calm water level in accordance with the concepts of the present invention.
Figure 10A:
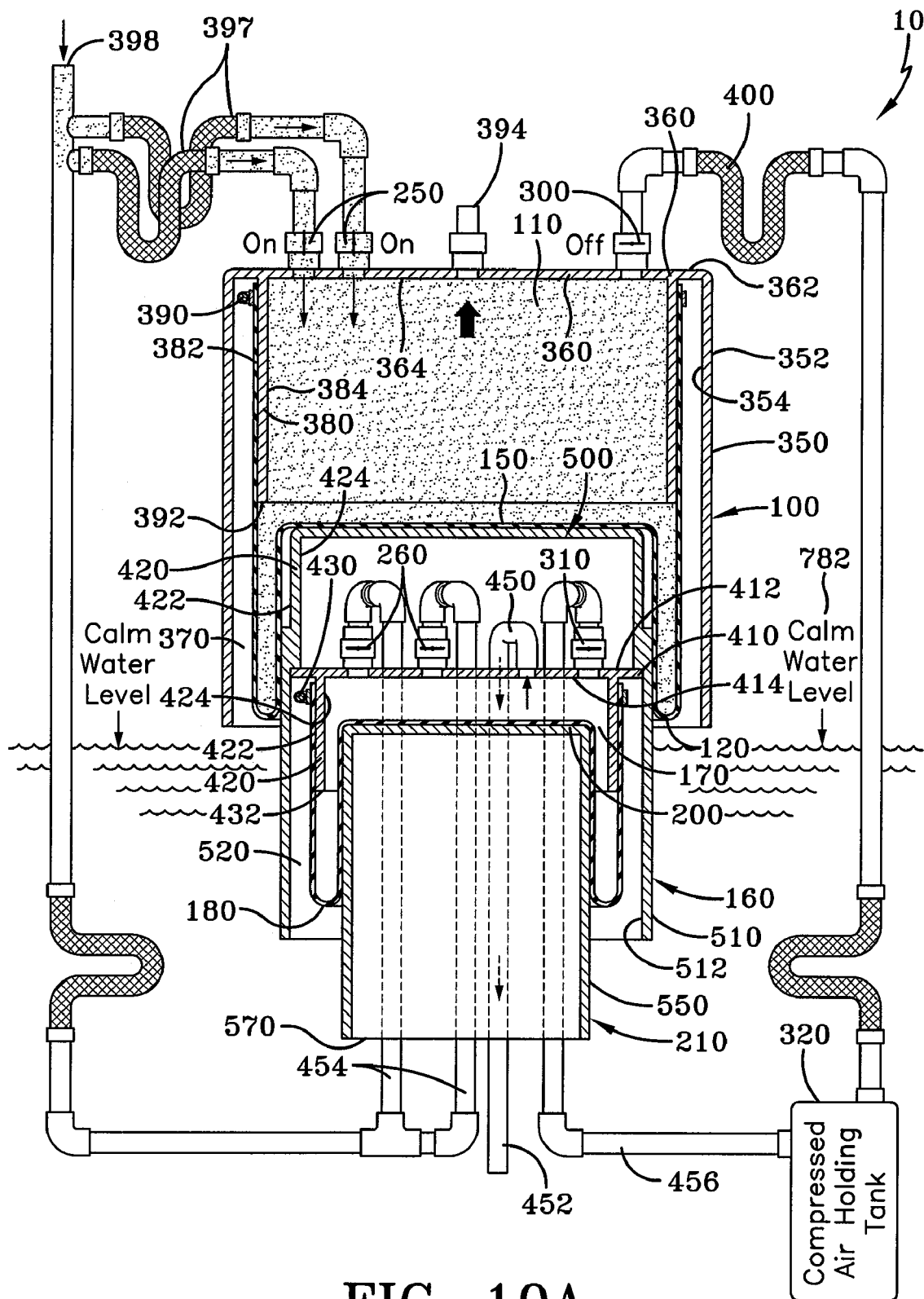
FIG. 10A is a sectional view showing the position of the upper, middle, and lower cylinders when the wave energy converter encounters a wave crest in accordance with the concepts of the present invention.
Figure 10B:
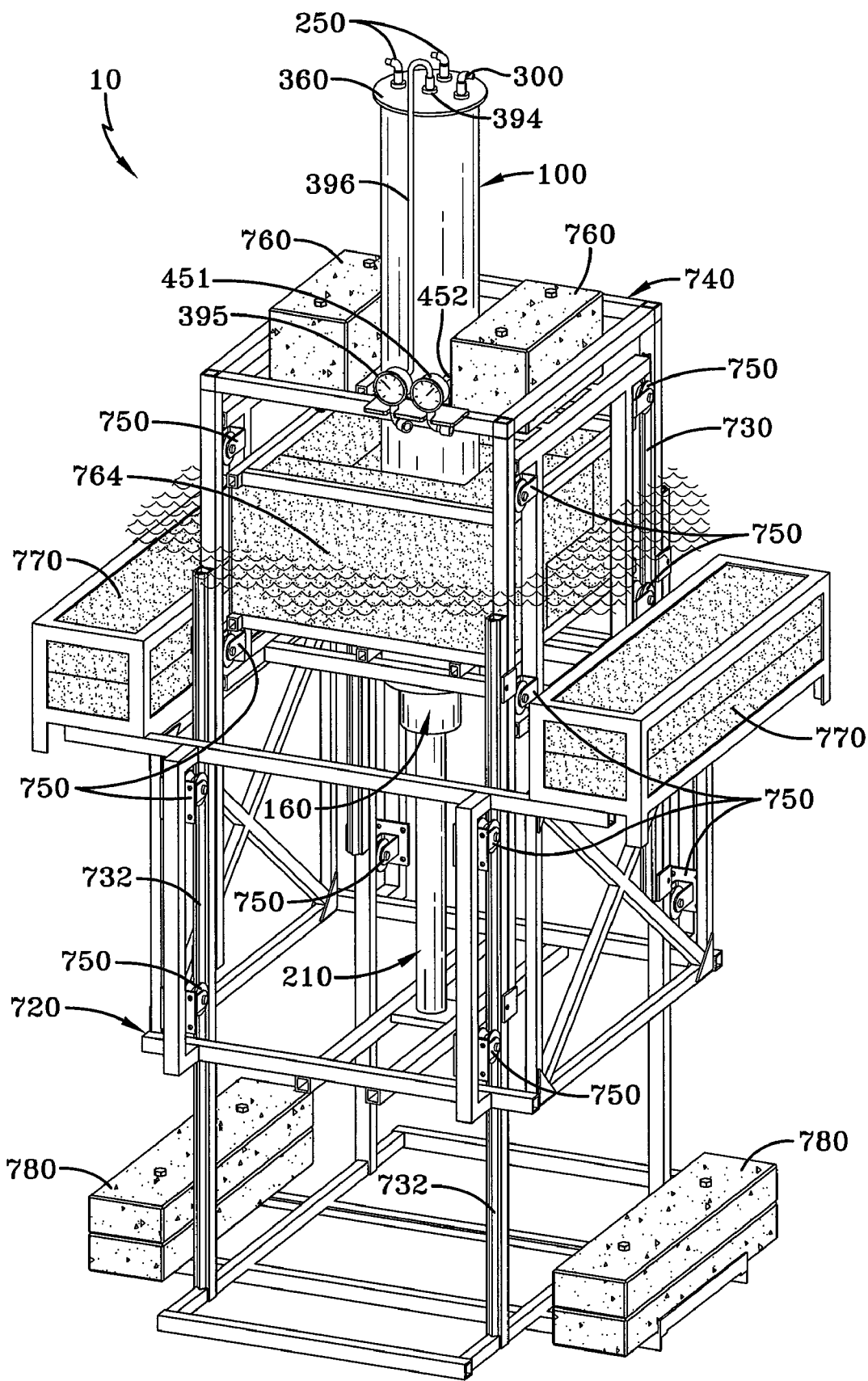
FIG. 10B is a perspective view of the support frame and the upper, middle, and lower cylinders when subjected to a wave crest in accordance with the concepts of the present invention.

Thus, with the structural components of the wave energy converter 10 set forth, the following discussion will now present the operation of the wave energy converter 10 when subjected to the presence of waves. Initially, when the wave energy converter 10 is at the calm water level, the upper and lower compression chambers 110,170 of the upper and lower cylinders 100,210 are fully compressed, as shown in FIGS. 9A-9B. As the crest of a wave is encountered by the wave energy converter 10, the upper cylinder 100 is raised due to its buoyancy, while the intake valves 250 open, allowing air from the environment to enter into the upper compression chamber 110, and causing the upper bladder 120 to expand downward along the inner surface 354 of the cylindrical wall 350 provided by the upper cylinder 100, as shown in FIGS. 10A-B. As the crest of the wave subsides and the water level returns back up to the calm water level, the upper cylinder 100 moves downward due to the weight section 760 attached thereto, whereupon the upper intake valves 250 close. As the upper cylinder 100 continues to move downward, the air within the upper compression chamber 110 is compressed by the weight of the upper cylinder 100 against the upper bladder 120 and the head 150 of the middle cylinder 160. Once the pressure of the compressed air within the upper compression chamber 110 reaches a predetermined level, the upper exhaust valve 300 is forced open, and the compressed air is then routed to the holding tank 320 via the attachment line 400. Once the air is moved into the holding tank 320 the pressure within the upper compression chamber 110 drops, and the upper exhaust valve 300 closes, thereby keeping the air within the holding tank under pressure.

Figure 11A:
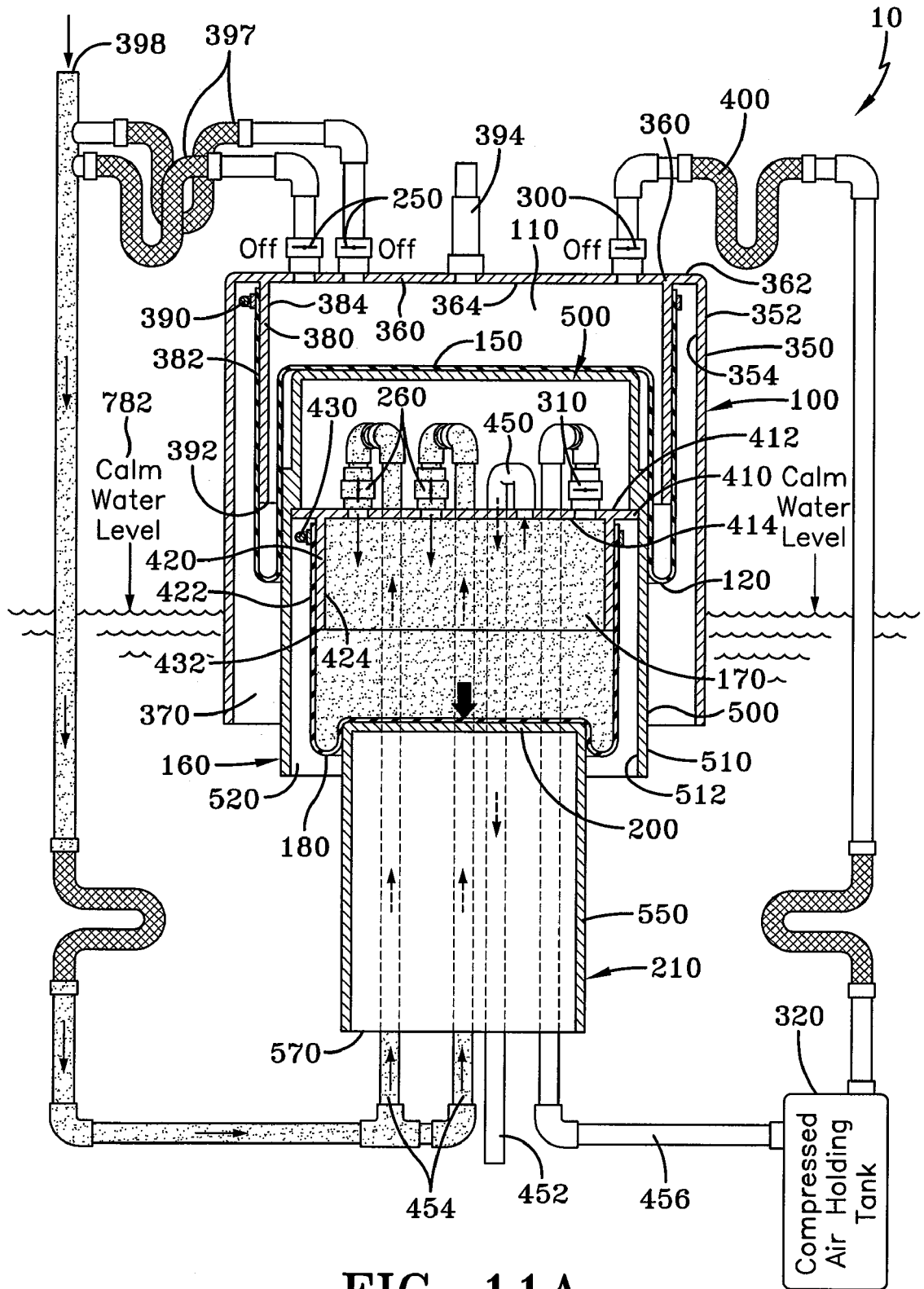
FIG. 11A is a sectional view showing the position of the upper, middle, and lower cylinders when the wave energy converter encounters a wave trough in accordance with the concepts of the present invention.
Figure 11B:
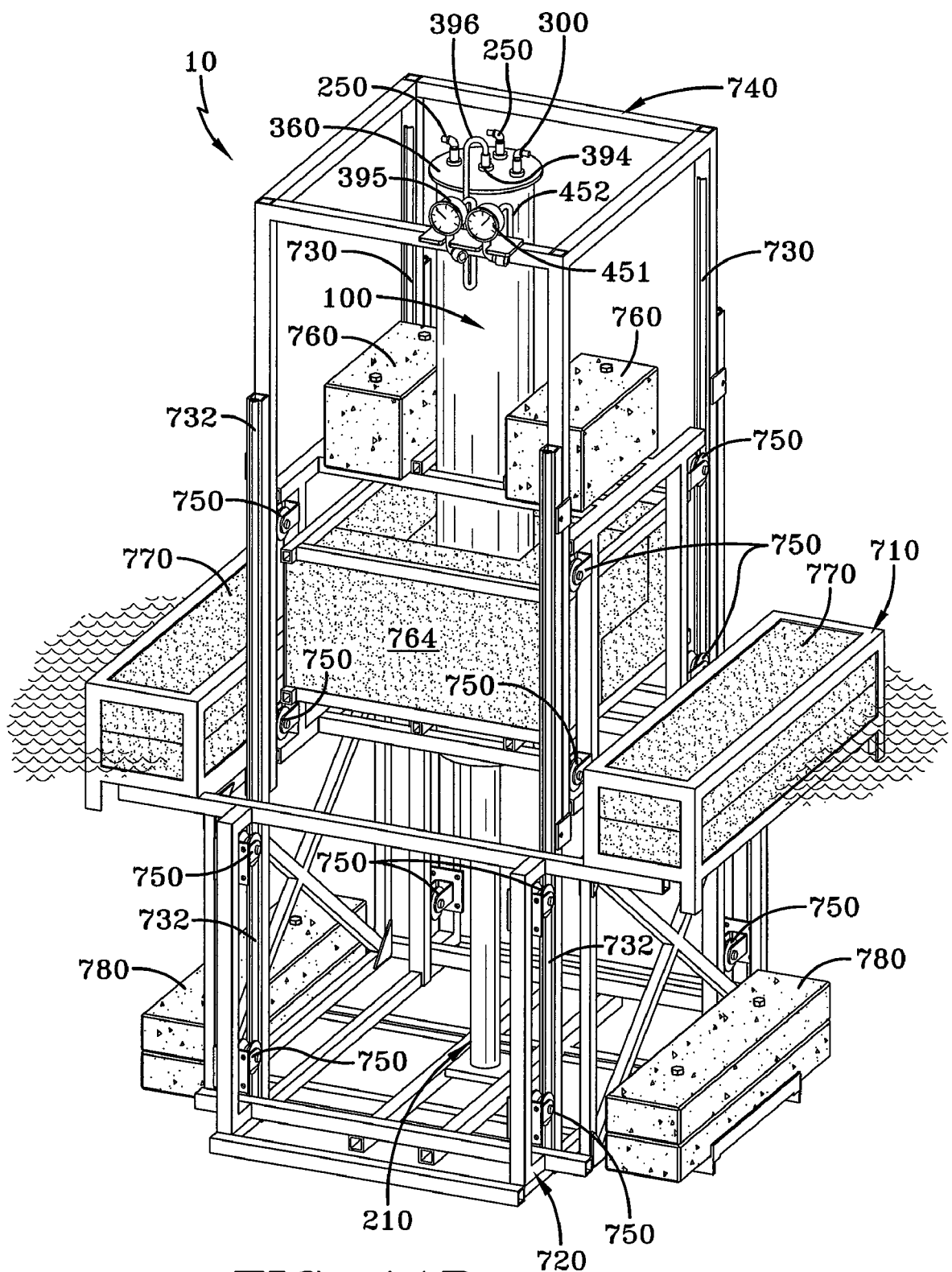
FIG. 11B is a perspective view of the support frame and the upper, middle, and lower cylinders when subjected to a wave trough in accordance with the concepts of the present invention.

Next, after the return of the upper cylinder 100 to the calm water level, and the trough of the wave is encountered by the wave energy converter 10, the lower cylinder 210 is lowered due to its weight, while the lower intake valves 260 open, allowing air from the environment to enter into the lower compression chamber 170, and causing the lower bladder 180 to expand downward along the inner surface 512 of the second section 504 of the cover 500 provided by the middle cylinder 160, as shown in FIGS. 11A-B. As the trough of the wave subsides and the water level returns back up to the calm water level, the lower cylinder 210 begins to move upward due to its buoyancy section 770, whereupon the lower intake valves 260 close. As the lower cylinder 210 continues to move upward, the air within the lower compression chamber 180 is compressed by the force of the lower head 200 of the lower cylinder 210 against the lower bladder 180 and the cap 500 of the middle cylinder 160. Once the pressure of the compressed air within the lower compression chamber 180 reaches a predetermined level, the lower exhaust valve 310 is forced open, and the compressed air is then routed to the holding tank 320 via the exhaust line 456.

Thus, the kinetic energy that is converted by the wave energy converter 10 into the movement of the upper cylinder 100 and the lower cylinder 210 is used to compress air that can be stored and subsequently converted into hydrogen using known processes. Because hydrogen is used as fuel by hydrogen fuel cells to generate electricity, the wave energy converter 10 is desirable for its ability to generate renewable power with reduced emissions.

It will, therefore, be appreciated that one advantage of one or more embodiments of the present invention is that a wave energy converter is provided to compress air using the movements of waves. Another advantage of the present invention is that the wave energy converter has enhanced operating efficiency, as it is able to intake and compress air during the transition of a wave from the calm water level, to the crest, and back to the calm water level, and during the transition of the wave from the clam water level, to the trough, and back to the calm water level. Still another advantage of the present invention is that the wave energy converter has a reduced amount of moving parts, thus increasing its reliability and overall operating life. Thus, based upon the foregoing, it will be appreciated that the concepts described above provide an improvement in the art.

Thus, it can be seen that one or more aspects of the invention have been satisfied by the structure and methods provided above. In accordance with the Patent Statutes, only the best mode and certain alternative embodiments have been presented in the application and described in any detail. It should be understood that the spirit and scope of the appended claims should not be limited to the description of the embodiments contained herein, the true scope and breadth of the invention being defined by the claims as follows.

What is claimed is:

1. A wave energy converter for compressing air from the movement of a wave comprising:

a first cylinder having a first cap end opposite a first open end, such that a first compression chamber is disposed within said open end and is in fluid communication with a first intake valve and a first exhaust valve carried by said first cap end;

a second cylinder having a second cap end opposite a second open end, said second cap end being covered by a first compression head that is carried by said second cylinder, said first compression head being slideably received within said first open end of said first cylinder and is in operative engagement with said first compression chamber, said second cylinder providing a second compression chamber disposed within said second open end that is in fluid communication with a second intake valve and a second exhaust valve carried by said second cap end, said upper and lower intake valves adapted to receive air;

a third cylinder having an end that is opposite a second compression head that is slideably received within said second open end of said second cylinder and which is in operative engagement with said second compression chamber; and a frame attached to said first, second and third cylinders, so as to retain said first and third cylinders with respect to said second cylinder as said first and third cylinders move;

wherein said second cylinder is positioned at about a calm water level, such that said first and second compression chambers receive air through said first and second intake valves as said first and third cylinders move away from said calm water level, said intake valves being closed, so as to compress said first and second compression chambers as said first and third cylinders move toward the calm water level to compress the air, the compressed air being released through said first and second exhaust valves.

2. The wave energy converter of claim 1, further comprising a holding tank in fluid communication with each of said first and second exhaust valves to receive the compressed air.

3. The wave energy converter of claim 2, wherein said holding tank is maintained below the calm water level.

4. The wave energy converter of claim 1, wherein the compressed air is released through said first and second exhaust valves when said first and second compression chambers reaches a predetermined pressure.

5. The wave energy converter of claim 1, wherein when said first exhaust valve is open said first intake valve is closed.

6. The wave energy converter of claim 5, wherein when said second exhaust valve is open said first intake valve is closed.

7. The wave energy converter of claim 1, further comprising a first guide that extends from said first cap end and into said first open end to form a first guide edge, wherein said first compression chamber is at least partially defined by a first flexible bladder that is folded by said first guide edge when said first compression chamber is compressed, such that a portion of said compression chamber is adjacent to one side of said guide and another portion of said compression chamber is adjacent to another side of said guide.

8. The wave energy converter of claim 7, further comprising a second guide that extends from said second cap end and into said second open end to form a second guide edge, wherein said second compression chamber is defined at least partially by a second flexible bladder that is folded by said second guide edge when said second compression chamber is compressed, such that a portion of said compression chamber is adjacent to one side of said guide and another portion of said compression chamber is adjacent to another side of said guide.

9. The wave energy converter of claim 8, wherein said first compression head is dimensioned to be received within said first guide.

10. The wave energy converter of claim 9, wherein said second compression head is dimensioned to be received within said second guide.

11. The wave energy converter of claim 1, wherein said frame comprises:
a support frame; and
a first and second sliding frame carrier that are slideably attached to said support frame;
wherein said first sliding frame carrier is attached to said first cylinder, and said second sliding frame carrier is attached to said third cylinder.

12. The wave energy converter of claim 10, further comprising a first buoyancy section and a weight section attached to said first sliding frame carrier, and a second buoyancy section attached to said second sliding frame carrier.

13. The wave energy converter of claim 1, wherein said first and second compression chambers contain an amount of fluid therein.

14. A method of compressing air comprising:
providing a wave energy converter having a first cylinder that includes a first flexible compression chamber, a second cylinder that includes a second flexible compression chamber and a compression head that is operatively engaged with said first compression chamber, and a third cylinder that includes a second compression head that is operatively engaged with said second compression chamber;

providing a frame attached to said first, second, and third cylinders, so as to retain said first and third cylinders with respect to said second cylinder as said first and third cylinders move;

maintaining said second cylinder positioned at about a calm water level that is approximately between the water level of wave crests and wave troughs;

floating said first cylinder upward from the clam water level toward the wave crest to draw air into said first compression chamber;

moving said first cylinder downward toward the calm water level after the occurrence of the wave crest to compress air in said first compression chamber;

transferring the compressed air to a holding tank that is in fluid communication with said first compression chamber;

moving said third cylinder downward away from the calm water level toward the wave trough to draw air into said second compression chamber;

floating said third cylinder upward toward the calm water level after the occurrence of the wave trough to compress air in said second compression chamber; and transferring the compressed air to said holding tank that is in fluid communication with said second compression chamber.

15. A wave energy converter for compressing air from the movement of a wave comprising:
a first cylinder having a first cap end opposite a first open end, such that a first compression chamber is disposed within said open end and is in fluid communication with a first intake valve and a first exhaust valve carried by said first cap end;

a second cylinder positioned at about a calm water level, said second cylinder having a second cap end opposite a second open end, said second cap end being covered by a first compression head that is slideably received within said first open end of said first cylinder and is in operative engagement with said first compression chamber, said second cylinder providing a second flexible compression chamber disposed within said second open end that is in fluid communication with a second intake valve and a second exhaust valve carried by said second cap end, said first and second intake valves adapted to receive air;

a third cylinder having an end that is opposite a second compression head that is slideably received within said second open end of said second cylinder and which is in operative engagement with said second compression chamber; and a frame attached to said first, second and third cylinders, so as to retain said first and third cylinders with respect to said second cylinder as said first and third cylinders move;

wherein as said first cylinder is floated from the calm water level by a wave crest, said first intake valve is opened and said first exhaust valve is closed, so as to draw air into said first compression chamber, and as said first cylinder returns to the calm water level, said first intake valve is closed and the air in said first compression chamber is compressed until a predetermined pressure is reached to release the compressed air through said first exhaust valve, and as said third cylinder falls from the calm water level by a wave trough, said second intake valve is opened and said second exhaust valve is closed, so as to draw air into said second compression chamber, and as said third cylinder is floated upward toward the calm water level, said second intake valve is closed, and the air in said lower compression chamber is compressed until a predetermined pressure is reached to release the compressed air through said second exhaust valve.

16. The wave energy converter of claim 15, further comprising a holding tank coupled to said first and second exhaust valves to store said compressed air.

17. The wave energy converter of claim 15, further comprising a first guide that extends from said first cap end and into said first open end to form a first guide edge, wherein said first compression chamber is at least partially defined by a flexible bladder that is folded by said first guide edge when said first compression chamber is compressed, such that a portion of said compression chamber is adjacent to one side of said guide and another portion of said compression chamber is adjacent to another side of said guide.

18. The wave energy converter of claim 17, further comprising a second guide that extends from said second cap end and into said second open end to form a second guide edge, wherein said second compression chamber is defined at least partially by a flexible bladder that is folded by said second guide edge when said second compression chamber is compressed, such that a portion of said compression chamber is adjacent to one side of said guide and another portion of said compression chamber is adjacent to another side of said guide.

19. The wave energy converter of claim 18, wherein said first compression head is dimensioned to be received within said first guide.

20. The wave energy converter of claim 19, wherein said second compression head is dimensioned to be received within said second guide.

* * * * *